Sept. 24, 1935.  L. A. FRAYER  2,015,595
MACHINE FOR MAKING NUTS
Filed June 7, 1930  6 Sheets-Sheet 1

INVENTOR
LEE A. FRAYER

ATTORNEYS

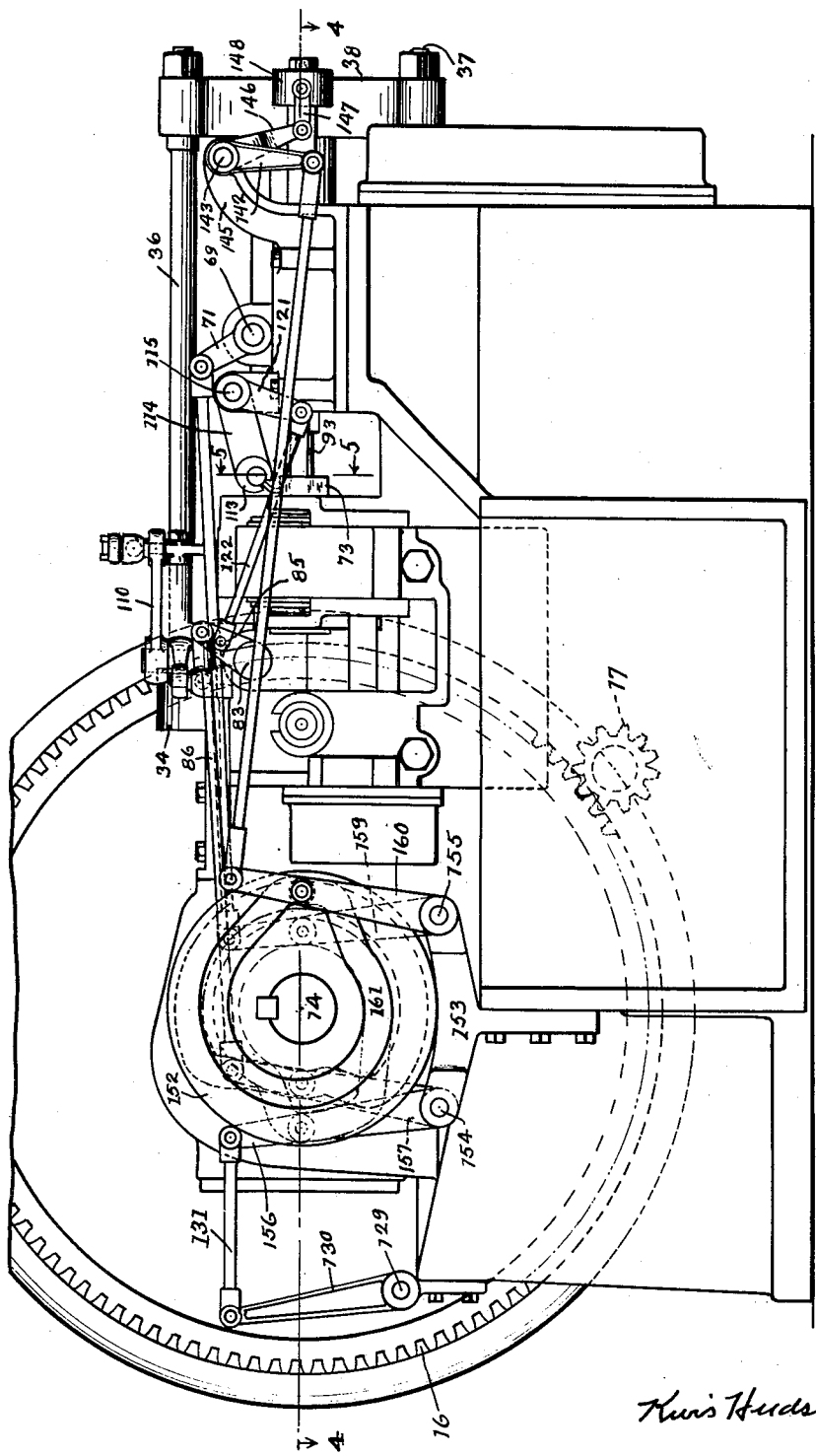

Sept. 24, 1935.　　　L. A. FRAYER　　　2,015,595
MACHINE FOR MAKING NUTS
Filed June 7, 1930　　　6 Sheets-Sheet 3
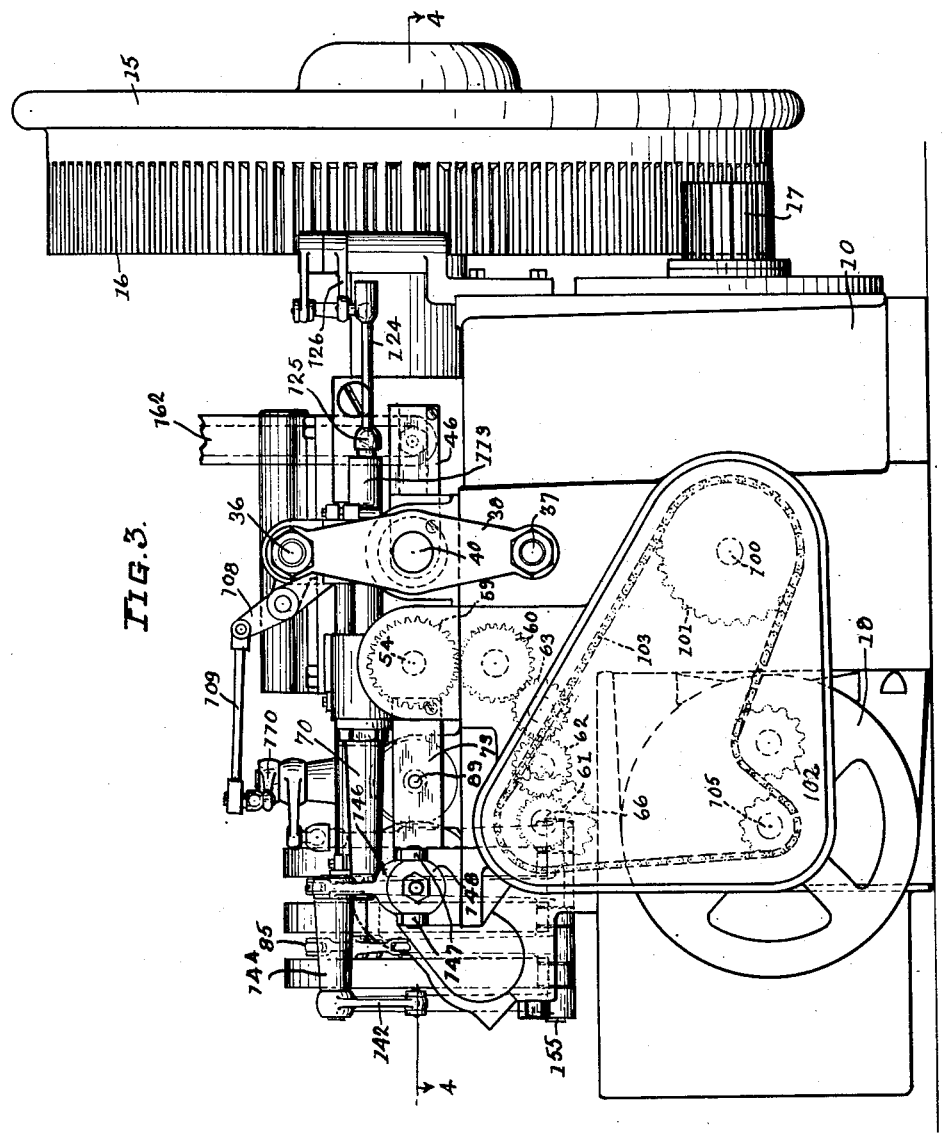
INVENTOR
LEE A. FRAYER.
BY
*Kwis Hudson + Kent.*
ATTORNEYS

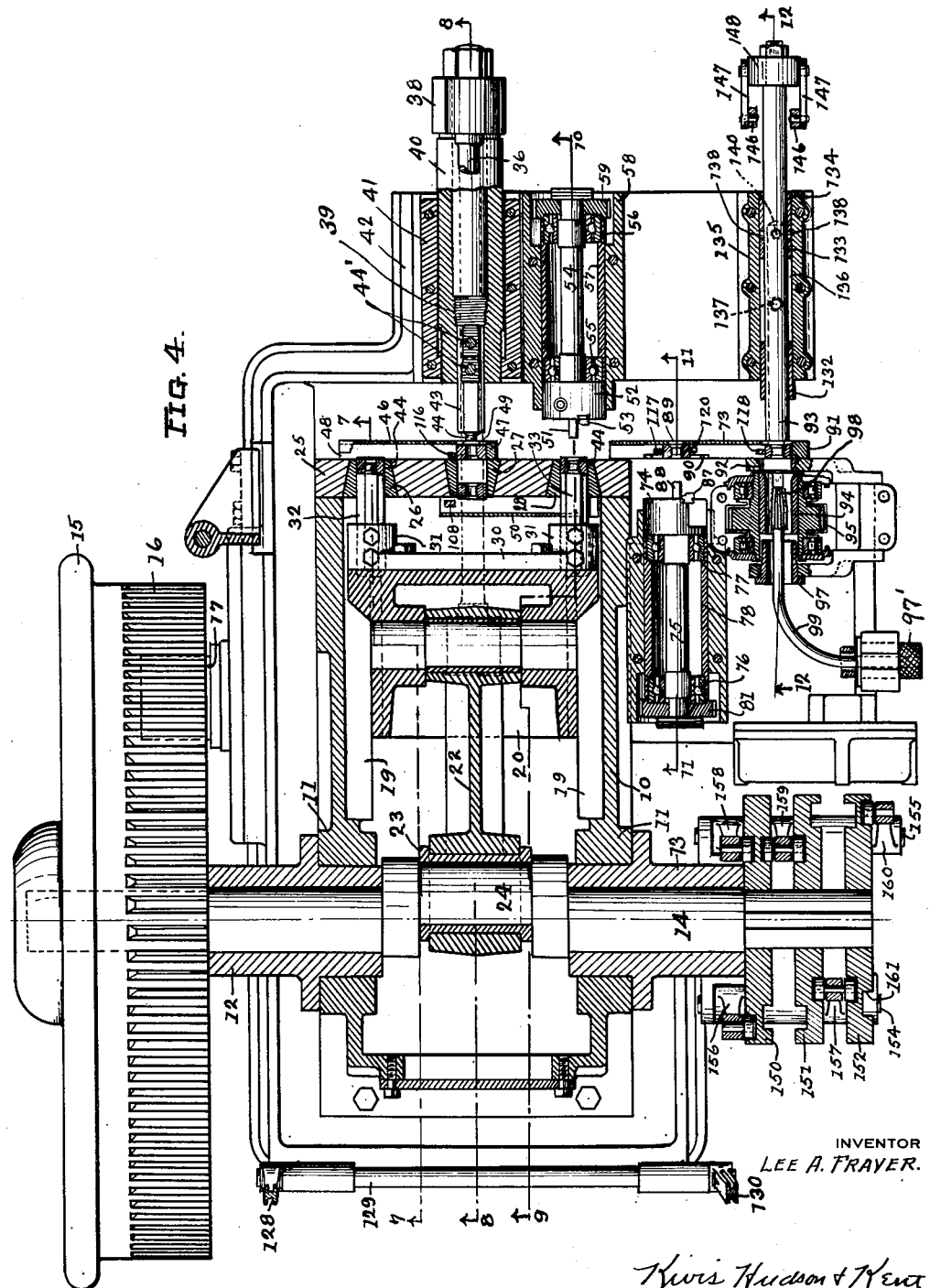

Sept. 24, 1935.  L. A. FRAYER  2,015,595
MACHINE FOR MAKING NUTS
Filed June 7, 1930  6 Sheets-Sheet 5
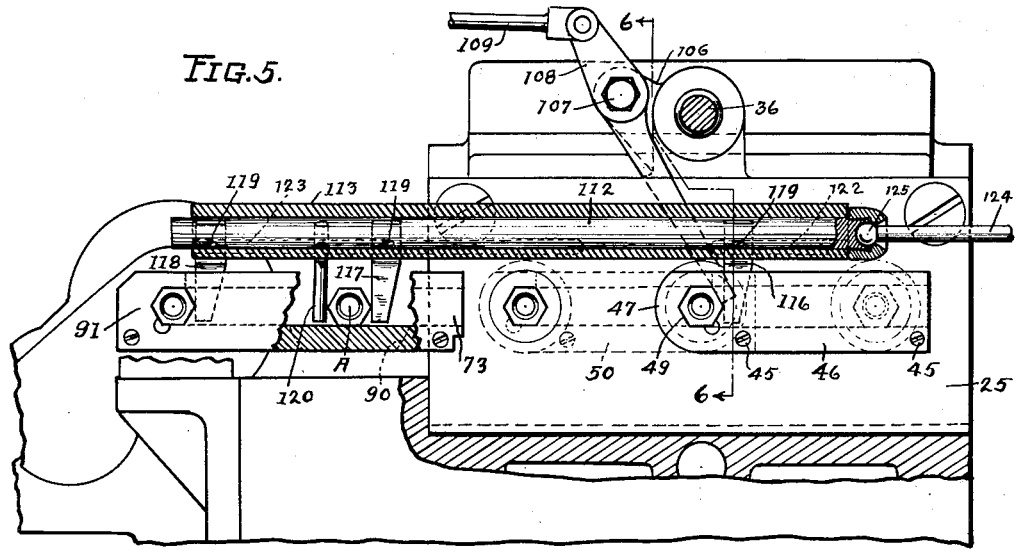
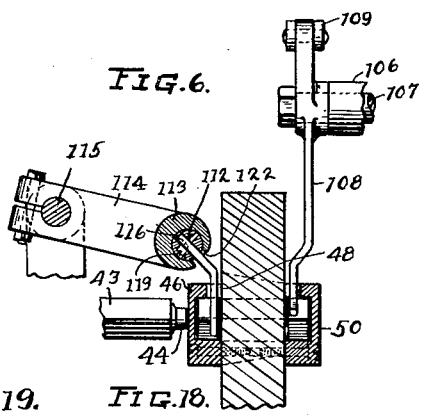
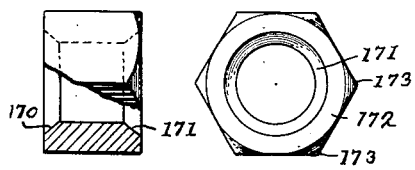
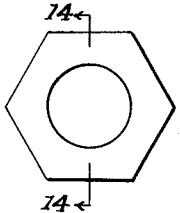
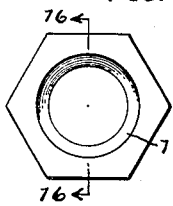
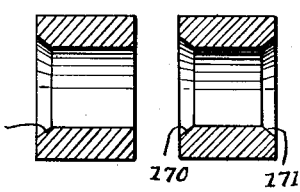
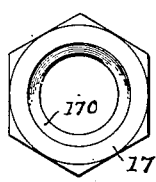
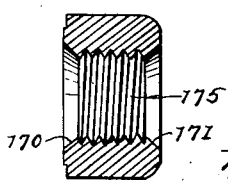
INVENTOR
LEE A. FRAYER.
ATTORNEYS.

Sept. 24, 1935.   L. A. FRAYER   2,015,595
MACHINE FOR MAKING NUTS
Filed June 7, 1930   6 Sheets-Sheet 6

INVENTOR.
LEE A. FRAYER.

ATTORNEYS
Kwis Hudson + Kent.

Patented Sept. 24, 1935

2,015,595

UNITED STATES PATENT OFFICE 2,015,595

MACHINE FOR MAKING NUTS

Lee A. Frayer, Kent, Ohio, assignor to Roy H. Smith, Kent, Ohio

Application June 7, 1930, Serial No. 459,656

20 Claims. (Cl. 10—75)

This invention relates to improvements in a method and machine for making nuts, starting with nut blanks of a crude character and proceeding through a series of operations, causing a gradual reduction in the outer dimensions of the blanks and a compacting, hardening and smoothing of the metal thereof, as well as the formation of the blanks with a high degree of precision. This is done by employing an oversized blank to start with, and passing it through a series of reducing dies of progressively smaller apertures until the desired dimensions are reached. Thereafter the hole in the blank is reamed, to bring it to exact diameter and center, either or both of the two faces of the blank are machined, and the hole is tapped.

At the present time, nut blanks of the highest grade are usually machined out of bar stock. This method involves the expenditure of considerable time, and wastes some little material because of the boring of the hole and because of the fact that the cutting tool for cutting off each blank must have width. The greater bulk of nut blanks now manufactured, however, are cold pressed out of strip metal. Here, again, there is a waste of material which, in the case of hexagonal nuts, runs in the neighborhood of 45% of the gross. Nuts manufactured in accordance with my new method are of far better quality than those made from blanks pressed out of strip steel, and are equal, if not superior, in accuracy, strength, hardness and finish to nuts turned out of bar stock. The waste of metal, however, is but 10% of the gross.

Accordingly, one of the objects of my invention is the provision of a method of making nuts which shall practically eliminate material waste and shall result in the formation of a nut of great precision, strength, hardness and fine finish.

Another object is the provision of a new method of making nuts from rough blanks, which involves passing oversized blanks through a series of reducing dies.

Another object is the provision of a machine adapted to carry the above method into effect automatically and to perform the desired additional operations, such as reaming the hole, machining the faces of the blank, and tapping the hole.

Various other objects and features of novelty will appear as I proceed with the description of that embodiment of the invention which, for the purposes of the present application, I have illustrated in the accompanying drawings, in which Figure 1 is a plan view of a machine constructed for carrying out my method automatically.

Figures 2 and 3 are side and end elevations respectively of the same.

Figure 4 is a horizontal sectional view taken substantially on the line 4—4 of Figures 2 and 3.

Figure 5 is a detail view illustrating the transfer mechanism on a larger scale, this view being taken partly in vertical section upon the line 5—5 of Figure 2.

Figure 6 is a cross sectional view taken substantially on the line 6—6 of Figure 5.

Figure 11:
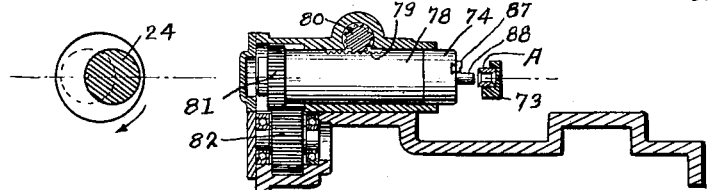
Figure 12:
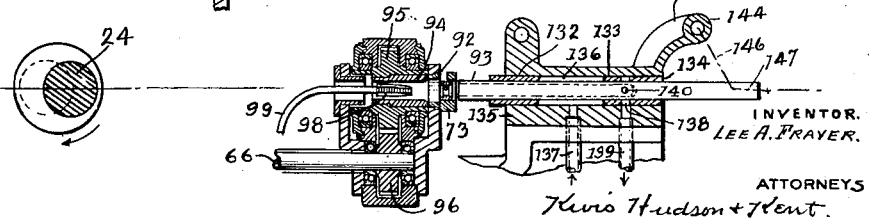

Figures 11 and 12 are diagrammatic vertical sectional views taken substantially on the lines 11—11 and 12—12 respectively of Figure 4.

Figure 13 is a plan view of one of the oversized rough blanks which are fed into the machine as the material to be worked upon.

Figure 14 is a cross section on the line 14—14 of Figure 13.

Figure 15 is a plan view of the blank following the first reducing operation, wherein one side of the blank is countersunk.

Figure 16 is a cross section on the line 16—16 of Figure 15.

Figure 17 is a cross section of the blank following the second reducing operation, wherein the other side of the blank is countersunk.

Figure 18 is a plan view of the blank after it has passed through the third reducing die and after the hole in the blank has been reamed and one face of the blank has been crowned.

Figure 19 is an edge view of the same partly broken away and partly in section.

Figure 20 is a plan view of that face of the blank which is opposite the one shown in Figure 18, and after the said face has been machined, as by the formation of a washer surface.

Figure 21 is an edge view, partly in section, of the blank shown in Figure 20, and Figure 22 is a diametrical sectional view of the completed nut following the tapping operation.

In the machine herein illustrated, the body or frame is shown at 10. In its opposite sides there are bearing supports 11 in which are mounted bushings 12 and 13 that form bearings for a main shaft 14, to which is secured at one end a flywheel 15. A gear 16 is cut into the flywheel 15 and meshes with a pinion 17 (Figure 3) that is driven by any suitable power connection, as from an electric motor 18.

The frame 10 is provided interiorly and at the same height as the shaft 14 with a pair of oppositely disposed horizontal guides 19, in which there is mounted to slide a cross head 20. This cross head carries a pin 21, in the nature of a piston pin, upon which one end of a connecting rod 22 is mounted to oscillate. The opposite end of this connecting rod contains a bushing 23 that surrounds a crank 24 or other eccentric formed as an integral part of the shaft 14. The cross head 20 is therefore reciprocated in the guides 19.

On the forward end of the frame 10 of the machine I secure a heavy metal plate 25 in which the reducing dies are mounted. These dies are illustrated in Figure 4 at 26, 27 and 28. They are held in the plate 25 by any suitable means known in the art. These dies are reducing dies as contradistinguished from trimming dies. Their apertures are somewhat larger at the entrance end than at the exit end, but as this is a matter of thousandths only, the difference is not apparent in the drawings. It is to be understood that the terms "reducing" and "reducing die", as hereinafter employed, shall be construed to exclude "trimming" and "trimming die" respectively, or any dies or operations which effect a cutting of the blank as distinguished from a compressing or extruding of the same. It will be noted that the dies 26 and 28 face in one direction, while the intermediate die 27 faces in the opposite direction.

On the forward face of the cross head 20 there is secured a plate 30 upon which are integrally formed bosses 31, that are provided with holes for the reception of plungers 32 and 33 shaped like the apertures in the dies 26 and 28, which are hexagonal in this instance, and formed to have an easy sliding fit within the apertures. The cross head 20 is provided with upwardly and downwardly extending projections 34 and 35 (see Figure 8) in which are mounted the rear ends of rods 36 and 37 that are secured at their front ends to a vertical cross bar 38. Integral with and extending rearwardly from the central point of this cross bar 38 is a sleeve 40 which slides in a cylindrical guide 41 suitably mounted in an extension 42 of the frame 10.

The sleeve 40 carries at its rear end a plunger 43 which is fixed in place by suitable means, such as set screws 44', and backed up by a threaded plug 39. The plunger 43 is shaped and sized to have an easy sliding fit within the aperture of die 27. All of the plungers 32, 33 and 43 are formed at their free extremities with arbors 44 of a size to fit the holes in the blanks, and there is a countersinking cone at the base of each arbor.

On the forward face of the plate 25 I mount, as by means of screws 45 (Figure 5), a horizontal chute 46 which is channel shaped, as illustrated in Figure 6, and closed at one end 47. The upper wall of the channel is open or slotted, as indicated at 48, for a purpose hereafter to be described. At a point opposite the aperture in die 27, the vertical wall of the channel is cut out as at 49, in order that the plunger 43 may pass therethrough. On the rear side of the plate 25, I mount another horizontal chute 50, which is substantially the same as chute 46, the opening in the side wall of the channel in this instance being arranged opposite the aperture in die 28, so as to permit the plunger 33 to pass through the chute into the die. After a blank leaves die 26, it enters chute 46 and is slid along therein to the end of the chute. It then enters die 27, is pushed through the die and out into chute 50, after which it is slid along in that chute to the end thereof opposite the die 28, and is caused to enter that die. The transfer mechanism by means of which the blanks are caused to move along these chutes, will be described hereinafter.

The lengths of the plungers 32, 33 and 43 are such that the blanks, which appear in section in Figure 4, are pushed by the plungers not quite all the way through the dies. When the plungers move backwardly out of the dies, the blanks are held therein with a tight grip which readily overcomes the friction between the blanks and the arbors 44, thus insuring the withdrawal of the arbors. Thin fins of metal are sometimes extruded from the blanks and flow backward for a short distance over a surface of the plungers. These fins are removed by being folded down upon the rear face of the blank by the next succeeding blank, which pushes the first blank out of the die. Occasional fins of this character would offer considerable difficulty to the transfer of blanks, were they permitted to remain upon the blanks. The method I employ of leaving each blank in the die until pushed out by the succeeding blank accomplishes the important result just stated, as well as the equally important result of insuring the firm retention of the blank while the arbor is being withdrawn.

The plunger 33 is of a length such as to move the blank into the die 28 to a position where the forward side of the blank protrudes a short distance beyond the exit end of the die, as shown in Figure 4. The blank is thereby held as in a work chuck, but with the maximum of accuracy and firmness. While the blank is in this position, a reaming tool 51 advances to ream out the hole in the blank to an accurate diameter and center, the accuracy of this operation being furthered by the accuracy of the chucking. The reaming tool 51 is carried by a rotating head 52 which may also carry a crowning cutter 53.

The head 52 is secured to one end of a spindle 54 that is mounted in ball bearings 55 and 56 carried by a sleeve 57, that is slidable lengthwise in a housing 58. The spindle 54 is rotated continuously, being driven by a gear 59 keyed to the spindle, which gear meshes with a wide gear 60 that is driven by any suitable means from the motor 18. In the present instance I have indicated in Figure 3 a chain of gears 61, 62 and 63, by means of which power may be taken from a shaft 66 for this purpose.

The sleeve 57 has a toothed rack 67 cut into its upper outer surface. A pinion 68 meshes with this rack, and by its rotation causes the sleeve 57 to move longitudinally, this movement being permitted by the fact that the gear 59 is slidable across the surface of the gear 60. The pinion 68 is mounted on one end of a rock shaft 69 which has bearing in a housing 70, and is oscillated at regular intervals through a crank 71 and a connecting rod 72 from a cam mechanism presently to be described.

After the machining of the blank in die 28 is completed, the blank is expelled from the die by the next succeeding blank and transferred into a horizontal chute 73 and along said chute to the position indicated at A. Axially aligned with the hole in the blank in this intermediate position, there is a rotating head 74 secured to a spindle 75 which is mounted in ball bearings 76 and 77 carried by a reciprocable sleeve 78 having a rack 79 which meshes with a pinion 80. The spindle 75 carries a gear 81 which meshes with a wide gear 82 that is continuously driven by any suitable means from the motor 18. The pinion 80 is mounted on a rock shaft 83 which has bearing in a housing 84. This shaft is provided with a crank 85 that is connected by a rod 86 with cam mechanism later to be described. The rotating heads 52 and 74 are therefore constructed substantially alike and are operated in a similar way. The head 74 carries a cutting tool 87 and a centrally mounted pilot 88 which is adapted to fit the hole in the blank and thereby hold the blank against movement lengthwise of the chute 73 while the blank is being machined by the cutter 87. In the vertical wall of the chute 73 I provide a hole 89 through which the pilot 88 may extend when the head 74 is in its forward or operative position. The back wall of the chute is also cut out for a short distance as indicated at 90 in order to clear the cutter 87.

One end of the chute 73 is closed, as shown at 91, in order to provide a stop for the blanks when they are transferred from the position A to the last station of the machine, that is the tapping station. Here they are located between a sleeve 92, of substantially the same thickness as the blanks, and a reciprocable plunger 93, which is free to rotate, but is not positively driven. In line with it there is a blank holder 94, which is mounted in the hub of a gear 95 that is driven by a gear 96 on the shaft 66. On the other side of the blank holder 94 there is a further sleeve 97. The tap 98 has a curved shank 99 which extends through the sleeve 97, is curved through an angle of 90°, and then extends out through another sleeve 97' to one side of the machine. Over this shank the nuts are fed and delivered into some suitable receptacle. The sleeves 92, 97 and 97' and the holder 94 are all removable and are selected to fit the nut being made. When a blank is to be threaded, it is pushed through the sleeve 92 into the blank holder 94, which is continuously rotated. As soon as the nut moves into the holder, it partakes of the rotation of the holder. After the blank has passed over the tap 98 it moves into the sleeve 97, and by its engagement with the walls of the latter serves to center and steady the tap. The sleeve 97' has a similar function.

The speed of rotation of the blank holder 94 remains constant at all times. However, it is necessary at times to provide nuts of a given size with different pitch threads, necessitating a different rate of speed of the blanks over the tap 98. This means that the plunger 93 must be advanced at a different rate, and as the movement of the plunger is effected through a cam upon the shaft 14, I provide means for driving the shaft 14 at different rates of speed, so that the movement of the plunger 93 may be caused to correspond with the travel of the blank necessary for the use of any one of several taps of different pitch. This is accomplished by selectively driving the shaft 100, see Figure 3, at different speeds, this shaft being connected with the pinion 17 by driving connections, (not shown). On this shaft 100, I mount selectively a sprocket wheel 101, having the requisite number of teeth to accomplish the desired rate of feed of the plunger 93. A chain 103 runs over this sprocket and a sprocket on shaft 66, being driven from a sprocket on the shaft 105 of motor 18. This chain 103 runs over an idler sprocket 102 which is suitably mounted to take up the slack regardless of the size of the sprocket wheel 101 being used. I may use more than one size of idler sprocket 102 or more than one length of chain 103 in order to accommodate a considerable range of sizes of sprocket wheels 101.

There is a transfer mechanism for moving the blanks in chute 50, and a separate mechanism for moving the blanks in chutes 46 and 73. The two mechanisms operate alternately. The machine frame carries a bracket 106 upon which is pivoted at 107 a lever 108, the lower end of which extends downwardly through the slot in the top of chute 50. This lever is adapted to swing from the position indicated in Figure 5 to a position such that its lower end will slide a blank to the left in that figure over to a position in front of the die 28. The upper end of the lever is connected with a rod 109 that is pivoted to one arm of the bell crank lever 110, the opposite arm of which is connected with a rod 111 by means of which it is reciprocated from cam mechanism presently to be described. The cam mechanism is so designed that the lever 108 stands most of the time in the position indicated in Figure 5. When a blank is delivered into the chute 50 from die 27, the lever makes a quick movement to transfer the blank to the intake end of die 28, and then quickly returns.

The other transfer mechanism comprises a rod 112, which is slidable within a cylinder 113, the latter being mounted upon the ends of three arms 114 carried by a rock shaft 115. The rod 112 is provided with diametrical slots in which are mounted three identical transfer fingers 116, 117 and 118, that are held in their slots by set screws 119 or the like. Near the finger 117, and spaced away from it a distance corresponding to the larger diameter of the blank, is a spring finger 120, similarly mounted in the rod. The finger 116 extends into the slot 48 in the top of chute 46, and the fingers 117, 118 and 120 extend into the slot in the top of chute 73. The rock shaft 115 is provided with a crank 121 to which is attached a rod 122 that connects with the top of crank 85 on shaft 83 previously mentioned. By this means the shaft 115 is oscillated, raising and lowering arms 114 and the cylinder 113, and with it the rod 112 and its fingers.

Cylinder 113 has two longitudinal slots 122 and 123 cut therein, through which the transfer fingers extend and are movable when the rod 113 is caused to move endwise. This endwise movement is effected by a rod 124 that is connected with the end of rod 112 by a ball and socket joint 125. The opposite end of rod 124 is similarly connected with one arm of a bell crank lever 126, the other arm of which is pivoted to a rod 127 extending to the rear end of the machine, where it is pivoted to a crank 128 on a rock shaft 129 which extends transversely of the machine. The opposite end of this rock shaft has secured thereto another crank 130 which is pivoted to a rod 131 operated by cam mechanism to be described later.

Figure 1:
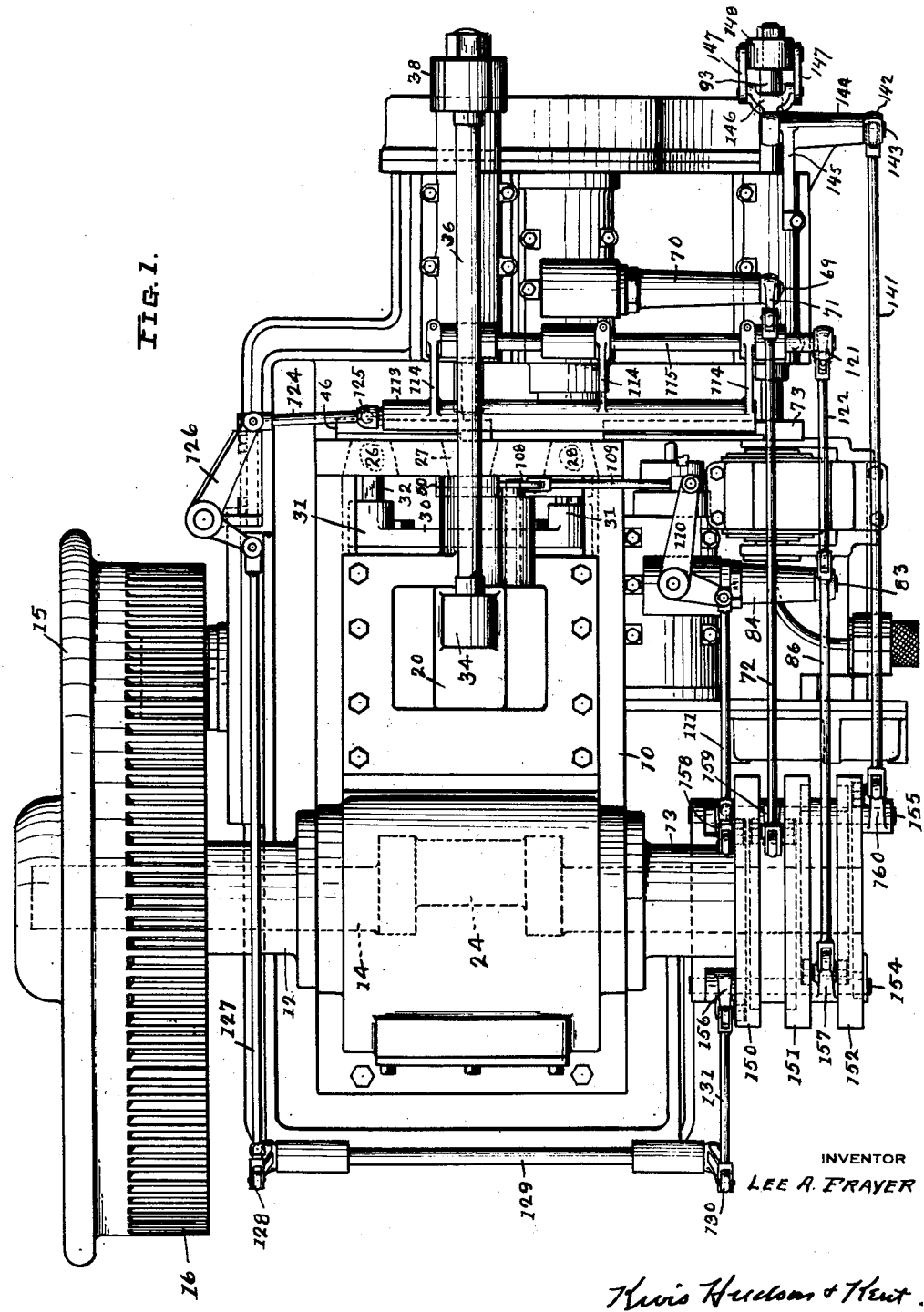

When the fingers 116, 117, 118 and 120 have travelled to the left as far as they will go, that is to the position illustrated in Figure 5, the shaft 115 is rotated clockwise through a small angle sufficient to lift the fingers to a level above the top of the groove in the chutes 46 and 73, and then the rod 112 is moved to the right by a pull delivered through the rod 124. Each of the fingers 116, 117 and 118 is thereby moved to the right in Figure 5 to a position beyond the next station, that is to the right of the blanks delivered from dies 26 and 28, and to the right of the blank in position A. Next the shaft 115, as viewed in Figure 1, is turned anti-clockwise to swing the transfer fingers 116 and 118 down into the chute groove and the transfer finger 117 with the spring finger 120 down into position on opposite sides of the forward face of die 28. A blank then moves out of the die 26 into the chute 46 and a blank moves out of the die 28 into frictional engagement with the finger 117 and the spring finger 120. Thereafter the rod 124 is caused to push the rod 112 back into the cylinder 113, or toward the left as viewed in Figure 5. The transfer fingers are thereby caused to travel through the groove, sliding the various blanks toward the left, or into the positions illustrated in Figure 5. The transfer fingers then rise again and the cycle of operations repeats itself. When this lifting of the fingers occurs, the blank at position A is held down both by the top wall of the chute 73 and by the engagement of the pilot 88 with the hole in the blank.

The plunger 93 which feeds the blank into the blank holder 94 for the tapping operation, is slidable in bushings 132, 133 and 134 mounted in a housing 135. The annular space 136 between the bushings 132 and 133 is connected with an oil delivery line 137, while the smaller annular space 138 between the bushings 133 and 134 is connected with an exhaust or leakage line 139 (see Figure 12). The forward end of the plunger 93 is hollow, and a port 140 extends through the wall of the plunger near the rear end of the hollow portion. When the plunger 93 has moved forward far enough to advance a blank into the rotating holder 94, so that the delivery of cutting liquid is required, the port 140 comes into register with the annular space 136, whereupon oil flows through the conductor 137, space 136, port 140 and the hollow interior of the plunger onto the cutting surfaces and along the longitudinal grooves of the tap 98. When the plunger 93 is retracted, the port 140 is covered by the bushing 133 and later exposed to the annular space 138 and the leakage conductor 139, so that the oil remaining in the hollow plunger tends to drain off through the conductor 139. Hence there is no delivery of cutting liquid except at the time when it is needed.

The movements of the plunger 93 backward and forward are effected by cam mechanism working through a rod 141 and a crank 142 to oscillate a shaft 143 mounted in bearings in a housing 144 supported upon a bracket 145. The opposite end of the shaft 143 carries a bifurcated crank arm 146, to the bifurcations of which are pivoted links 147 attached to a collar 148 on the extremity of the plunger 93.

The forward end of the main shaft 14 has keyed thereto a series of three spaced cam disks 150, 151 and 152. Below these disks there is a bracket 153 carrying rods 154 and 155. Levers 156 and 157 are pivotally mounted upon the rod 154, and levers 158, 159 and 160 are similarly mounted upon the rod 155. The lever 156, which is connected at its upper end to rod 131, carries a cam follower which runs in a cam groove on the rear face of disk 150. Lever 157, connected at its upper end to rod 86, carries two cam followers which run in similarly formed grooves on the forward face of disk 151 and the rear face of disk 152. Lever 158, which is connected at its upper end to rod 111, has a follower running in the same groove on the rear face of disk 150 in which the follower of lever 156 runs. Lever 159, the upper end of which is connected with the rod 72, carries followers which run in similar grooves on the forward face of disk 150 and the rear face of disk 151. Lever 160, the upper end of which is connected with rod 141, carries a follower which runs in a cam groove 161 in the forward face of disk 152.

The same cam disks 150 and 151 can be employed for nuts varying considerably in size, since the travel of the sleeves 57 and 78 does not need to change, and the cam disk 152 also is a permanent or semi-permanent part of the machine, since the variation in rate of travel of plunger 93 is accomplished by selection of the proper sized sprocket 101, as previously explained.

Figure 7:
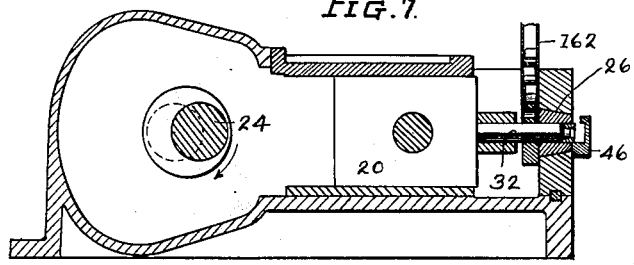
Figure 7 is a diagrammatic vertical sectional view taken substantially on the line 7—7 of Figure 4, with the cross head in the position of that figure.

I have not disclosed herein the hopper from which the original rough blanks are fed, as this hopper may be of any conventional or other design, but in Figures 3 and 7, I have shown at 162 the vertical chute leading downwardly from the hopper along the rear side of plate 25 in vertical alignment with the die 26. Each time the plunger 32 is retracted, the column of blanks in the chute 162 descend until the lower one rests upon the bottom of the chute. Then when the plunger 32 advances, this bottom blank is engaged by the arbor 44 on the plunger and moves from the chute into the die, the top surface of the plunger supporting the column of blanks thereafter. At the base of each arbor 44, that is at the juncture of the arbor with the plunger proper, there is a conical surface which engages the blank as it is pressed through the die, and forms in the blank a countersunk surface.

The operation of the machine herein disclosed has been explained in connection with the description of its parts. However, some further explanation of my new method of manufacture and of the movements of the herein disclosed machine for carrying out that method, may be in order, reference being had particularly to the disclosure in Figures 7 to 22 inclusive.

Figure 8:
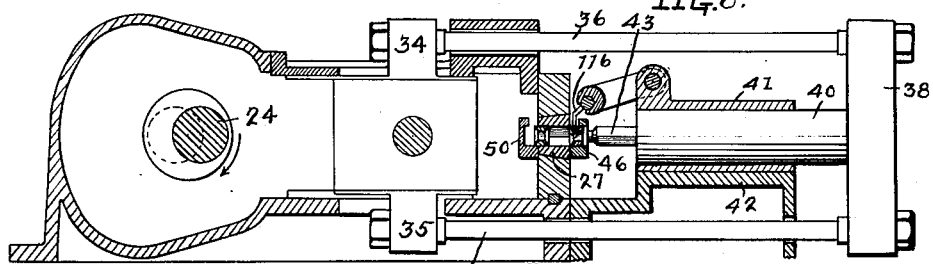
Figure 8 is a similar view taken substantially on the line 8—8 of Figure 4.
Figure 9:
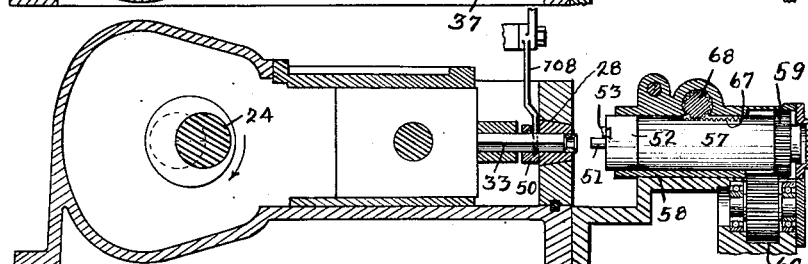
Figure 9 is a similar view on the line 9—10 of Figure 4.
Figure 10:
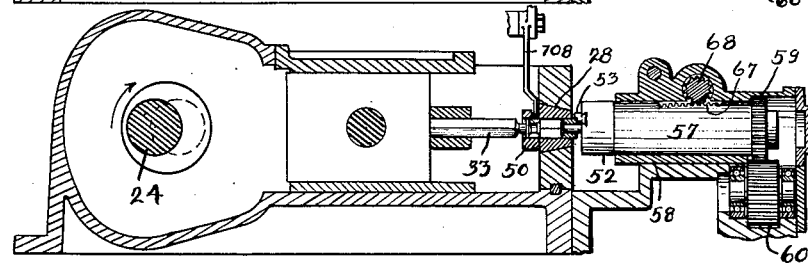
Figure 10 is a view similar to Figure 9, but showing the parts in the position which they assume when the cross head is at the left limit of its movement.

Figures 7, 8 and 9, like Figure 4, show the condition of the machine when the crank 24 is forward. At this time the plunger 32 has removed the bottom blank from the chute 162 and pushed it through the die 26 to the position shown, whereby the preceding blank has been discharged into the chute 46, and the transfer finger 116 has moved that blank over to the end of the chute in front of the die 27. Just previous to the forward movement of the crank, the transfer finger 108 has moved a blank along the chute 50 to a position in front of die 28, and then has immediately swung back again to its normal position. On the forward movement of the crank 24, the plunger 33 has pushed this blank into the die 28 until its forward end has protruded beyond the exit end of the die, as shown in Figure 9. At this time the rotating head 52 is withdrawn from operative position.

On the return stroke of the crank 24, the plungers 32 and 33 are withdrawn, permitting blanks to be moved into position in front of them, this movement of the plungers requiring very little power, but at the same time the plunger 43 is advanced to push a blank into the die 27 and force out the blank already in that die. Hence the expenditure of power is equalized to some extent. The condition of the parts associated with die 28 on the return stroke of the crank 24 is disclosed in Figure 10, where it will be seen that the sleeve 57 has been advanced to cause the reaming tool 51 to ream the hole in the blank and where the crowning cutter 53 is shown machining the exposed face of the blank.

While the rotating head 52 is machining a blank from one side, the head 74 is machining another blank from the other side. In Figure 11 the head 74 is shown in inoperative position, corresponding to the condition of the machine illustrated in Figures 7, 8 and 9. But when the crank is in the position shown in Figure 10, the head 74 will have moved forward, the pilot 88 will have entered the hole in the blank at position A, and the cutter will be facing the exposed surface of the blank. At this same time also, the plunger 93 will have engaged the blank then in position at the end of chute 73 and will have pushed it first into the sleeve 92 and then into the rotating holder 94 and over the tap 98.

Figures 13 and 14 represent the blank in its original state, except that no attempt has been made to illustrate the roughness and inaccuracy to which it is subject. This blank may be, and preferably is, as much as .050 oversize. Its condition after it emerges from die 26 is illustrated in Figures 15 and 16, where its outer transverse dimensions have been reduced .020 or more, and its thickness slightly increased. At the same time one face has been countersunk as indicated at 170. Figure 17 illustrates the condition of the blank after passing through die 27, where its outer dimensions are reduced materially, another .020 for example, and the other face of the blank countersunk, as indicated at 171. The condition of the blank after it emerges from the third die 28, and after the rotating head 52 has machined the blank, is shown in Figures 18 and 19. A further reduction of, say .010, has then been effected, the hole in the blank has been accurately reamed, the end surface 172 has been machined, and the corners 173 cut back, that is to say, crowned. In Figures 20 and 21, I have shown the blank after being machined by the head 74 so as to produce a washer surface 174. Any other desired surfacing could of course be substituted for either or both sides of the blanks. Figure 22 shows the completed nut following the tapping operation, in which the threads 175 are cut into the reamed hole.

As before remarked, the reducing operations serve not only to bring the blank down to accurate dimensions, but also to compact, harden, strengthen and smooth the metal, producing a nut of precision and fine finish which is superior in strength to nuts made by other methods.

While in the foregoing description and in the accompanying drawings I have disclosed more or less in detail one particular machine for carrying the invention into effect, I desire it to be understood that such detailed disclosure has been resorted to primarily for the purpose of fully illustrating the invention in accordance with the requirements of the statute, and that it is not to be construed as amounting to any limitation upon the scope of the invention.

Having thus described my invention, I claim

1. In a machine of the class described, a plurality of blank forging dies provided with progressively smaller apertures extending through the dies adapted to have work blanks moved therethrough, a corresponding number of punches adapted to slide in said dies, each of said punches being provided with an arbor adapted to fit a hole in the blank, means for advancing said punches into said dies in timed relation to move the blanks through the dies, and means for transferring blanks expelled from certain of said dies to the next succeeding dies in the interim between successive strokes of said punches.

2. In a machine of the class described, a pair of oppositely facing forging dies, provided with progressively smaller tapered apertures, a crank shaft, a pair of oppositely arranged plungers operatively connected with said shaft and adapted to force blanks into said dies alternately as said shaft rotates, and means for transferring a blank from the exit end of one of said dies to the entrance end of another of said dies.

3. In a machine of the class described, a first and third die both facing in a given direction provided with apertures adapted to have work blanks forced therethrough, a second die oppositely facing interposed between said first named dies and provided with an aperture adapted to have work blanks forced therethrough, a reciprocable cross head, a first and a third plunger connected therewith for cooperation with said first named dies and a second oppositely directed plunger connected with said cross head adapted to cooperate with said second die, said plungers being adapted to force nut blanks into said first and third dies on one stroke of said cross head and into said second die on the other stroke of said cross head, and means for transferring blanks from the exit end of the first and second dies to the entrance end of the second and third dies respectively.

4. In a machine for finishing nut blanks, a forging die adapted to reduce, compact and smooth the blanks as the same are moved therethrough, a plunger of the same exterior form as the interior form of the die opening adapted to slide thereinto, and means for advancing said plunger far enough to force a blank partly through said die, whereby the succeeding blank will engage and press down any thin fin extruded from the first blank, and will thereafter force the first blank out of the die.

5. In a machine for finishing nut blanks, a forging die provided with an aperture adapted to have blanks forced therethrough for reducing, compacting and smoothing the blanks, a punch provided with a central arbor adapted to fit the central hole in a blank, means for reciprocating said punch for moving a blank partly through said die, the friction between said die and blank being greater than that between said arbor and blank, whereby the blank remains in said die upon the retraction of said punch and is forced out of said die by the succeeding blank.

6. In a machine for finishing nut blanks, a forging die provided with an aperture for reducing, compacting and smoothing the blanks, a punch provided with a central arbor adapted to fit the central hole in a blank, means for reciprocating said punch to force a blank nearly through said die, a transverse blank chute engaging the exit face of said die, the friction between said die and blank being greater than that between said blank and arbor, whereby said arbor leaves the blank upon the reciprocation of said punch and the succeeding blank forces the first named blank out of said die into said chute, and means for moving blanks along said chute.

7. In a machine of the class described, a die for reducing, compacting and smoothing blanks, means for pushing a blank through said die far enough to cause one face of the blank to protrude from said exit end of the die, a rotatable tool for machining the blank while it is thus held in the die, means for moving said tool toward and from said die, and means for pushing the machined blank out of the die.

8. In a machine of the class described, a die for reducing, compacting and smoothing a blank, a plunger adapted to slide in said die, means for advancing said plunger far enough to push a blank through said die to such a position that one side of the blank protrudes from the exit end of said die and then retracting said plunger, and a rotatable tool adapted to machine the blank while it is thus held in the die, the blank which is advanced by the next forward movement of the plunger forcing the first named blank out of the die.

9. In a machine of the class described, a die provided with an aperture for reducing, compacting and smoothing a blank, a plunger adapted to slide in said aperture, means for advancing the plunger far enough to push the blank part way through the die and then retracting the plunger, a rotating reamer mounted to move axially toward and away from said die for reaming the hole in the blank while the plunger is retracted, the next forward movement of the plunger causing a succeeding blank to push the first named blank out of the die.

10. In a machine of the class described, a chute in which the nut blanks are adapted to slide, said chute having side walls adapted to guide the blanks by engagement with opposed wrench facets thereof, means for moving the blanks forward into a given position in said chute, a rotating head carrying a pilot adapted to enter the hole in the blank and carrying also a tool adapted to machine one face of the blank, means for advancing said head to cause the pilot and tool to engage the blank, and means for withdrawing said blank advancing means after the pilot has entered the hole in the blank and before the tool has finished its operation.

11. In a machine of the class described, a reducing die adapted to receive and reduce a blank, means for machining the blank from one side thereof while it is still in the die, means for expelling the blank and transferring it to another position, means for machining the blank from the other side at said last named position, means for transferring the blank to a further position, and means for tapping the blank at said last named position.

12. In a machine of the class described, a die for reducing, compacting and smoothing a blank, means for pushing a blank through the die until the forward face of the blank is exposed, means for machining that face while the blank is held by said die, said first named means on the succeeding stroke pushing a succeeding blank to the same position, whereby the first named blank is expelled from the die.

13. A nut-forming machine of the character described comprising a frame, a plurality of nut-forming forging dies supported by said frame and provided with progressively smaller polygonal apertures, and means for moving polygonal nut blanks through said apertures whereby the transverse dimensions of said blanks are reduced and the surface thereof hardened and smoothed.

14. A nut-forming machine of the character described comprising a frame, a plurality of nut-forming forging dies supported by said frame and provided with progressively smaller polygonal tapered apertures, and means for moving polygonal nut blanks through said apertures whereby the transverse dimensions of said blanks are reduced and the surface thereof hardened and smoothed.

15. A nut-forming machine of the character described comprising a frame, a plurality of nut-forming forging dies supported by said frame and provided with progressively smaller polygonal apertures, means for transferring polygonal nut blanks from one of said dies to another, and means for moving polygonal nut blanks through said apertures whereby the transverse dimensions of said blanks are reduced and the surface thereof hardened and smoothed.

16. A machine of the character described comprising a frame, a plurality of forging dies supported by said frame and provided with progressively smaller tapered apertures, means for moving blanks through said apertures whereby the transverse dimensions of said blanks are reduced and the surface thereof hardened and smoothed, and means for transferring blanks from the exit end of one of said dies to the entrance end of another of said dies.

17. A machine of the character described comprising a frame, a plurality of stationary forging dies supported by said frame and provided with progressively smaller apertures adapted to have blanks moved therethrough, a plurality of punches adapted to force blanks through said apertures, said punches being paired with said stationary dies, means for feeding blanks to the entrance end of one of said dies, means for transferring blanks from the exit end of one of said dies to the entrance end of another of said dies, and means for reciprocating said movable dies.

18. A machine of the character described comprising a frame, a plurality of oppositely facing stationary forging dies supported by said frame and provided with progressively smaller apertures adapted to have blanks moved therethrough, a plurality of punches adapted to force blanks through said apertures, said punches being paired with said stationary dies, means for feeding blanks to the entrance end of one of said dies, means for transferring blanks from the exit end of one of said dies to the entrance end of another of said dies, and means for reciprocating said punches whereby blanks are moved in one of said stationary dies upon each reciprocation of said punches.

19. A machine of the character described comprising a frame, a plurality of oppositely facing stationary forging dies supported by said frame and provided with progressively smaller apertures adapted to have blanks moved therethrough, a cross-head slidably supported by said frame, a plurality of punches adapted to force blanks through said apertures and supported by said cross-head, said punches being paired with said stationary dies, means for feeding blanks to the entrance end of one of said dies, means for transferring blanks from the exit end of one of said dies to the entrance end of an oppositely facing die, and means for reciprocating said cross-head whereby blanks are moved in one of said apertures upon each reciprocation of said cross-head.

20. A machine of the character described comprising a frame, a stationary forging die supported by said frame, a punch for moving nut blanks through said die, and means for reciprocating said punch to cause one face of a blank to protrude from the exit end of said die whereby the succeeding blank will force the first blank out of the die upon the next reciprocation of said punch.

LEE A. FRAYER.